US012803953B2

(12) United States Patent
Ante et al.

(10) Patent No.: US 12,803,953 B2
(45) Date of Patent: Nov. 17, 2026

(54) DEVICE HAVING A COMMUNICATION APPARATUS FOR DATA TRANSFER VIA A DATA-TRANSFER BUS

(71) Applicant: Vitesco Technologies GmbH, Regensburg (DE)

(72) Inventors: Johannes Ante, Neutraubling (DE); Torsten Reitmeier, Wackersdorf (DE); Daniel Luszek, Sinzing (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 126 days.

(21) Appl. No.: 18/845,632

(22) PCT Filed: Mar. 9, 2023

(86) PCT No.: PCT/EP2023/055991
§ 371 (c)(1),
(2) Date: Sep. 10, 2024

(87) PCT Pub. No.: WO2023/170198
PCT Pub. Date: Sep. 14, 2023

(65) Prior Publication Data

US 2025/0202864 A1 Jun. 19, 2025

(30) Foreign Application Priority Data

Mar. 11, 2022 (DE) ..................... 10 2022 202 455.9

(51) Int. Cl.
*H04L 61/50* (2022.01)
*G06F 13/40* (2006.01)
(Continued)

(52) U.S. Cl.
CPC ...... *H04L 61/5038* (2022.05); *G06F 13/4068* (2013.01); *H04L 61/5061* (2022.05)

(58) Field of Classification Search
CPC ............. H04L 61/5038; H04L 61/5061; G06F 13/4068
See application file for complete search history.

(56) References Cited

U.S. PATENT DOCUMENTS 5,670,861 A * 9/1997 Nor ....................... B60L 3/0046 340/636.15
6,216,172 B1 4/2001 Koelblin
(Continued)

FOREIGN PATENT DOCUMENTS

DE 102009044415 A1 5/2010
DE 102013201106 A1 7/2014
(Continued)

OTHER PUBLICATIONS

Search Report for International Application No. PCT/EP2023/055991, 12 pages, Jun. 21, 2023.
(Continued)

*Primary Examiner* — Mohamed A. Wasel
(74) *Attorney, Agent, or Firm* — Slayden Grubert Beard PLLC

(57) ABSTRACT

Various embodiments of the teachings herein include a device comprising: a communication apparatus for sending and/or receiving data via a data transmission bus and a device-side connection apparatus connecting the device to the bus. The connection apparatus includes electrical contacts to be connected in pairs to bus-side electrical contacts of a connection apparatus on the bus. The contacts comprise a data contact for a data signal, a supply contact to transmit a first supply potential, a second supply contact to transmit a second potential different from the first, and a third contact. A voltmeter measures a potential present at the third contact with respect to the first supply potential and/or the second supply potential. The communication apparatus assigns an address to the device for sending and/or receiving the data
(Continued)

via the bus, selected from multiple different predefined addresses on the basis of the potential measured at the third contact.

10 Claims, 6 Drawing Sheets

(51) Int. Cl.
*H04L 61/5038* (2022.01)
*H04L 61/5061* (2022.01)

(56) References Cited

U.S. PATENT DOCUMENTS

| | | | |
|---|---|---|---|
| 7,328,286 | B2 | 2/2008 | Vinnemann |
| 8,930,506 | B2 | 1/2015 | Nguyen |
| 8,935,450 | B2 | 1/2015 | Nierop |
| 10,204,072 | B2 | 2/2019 | Schmidt |
| 2010/0121534 | A1 | 5/2010 | Tanaka |
| 2010/0185784 | A1 | 7/2010 | De Nie |
| 2014/0266779 | A1* | 9/2014 | Grothaus ................ H04W 4/70 340/870.02 |
| 2016/0254925 | A1 | 9/2016 | Riedel |
| 2016/0261426 | A1* | 9/2016 | Vandersteegen ............................. H04L 12/40195 |
| 2019/0086475 | A1* | 3/2019 | Takeshita ............. G01R 31/392 |
| 2022/0276978 | A1 | 9/2022 | Sattele |
| 2022/0283977 | A1 | 9/2022 | Sattele |
| 2023/0070899 | A1* | 3/2023 | Assmann ............ H01M 10/425 |

FOREIGN PATENT DOCUMENTS

| | | | |
|---|---|---|---|
| DE | 102019212414 | A1 | 2/2021 |
| DE | 102019212415 | A1 | 2/2021 |
| DE | 102020104375 | A1 | 8/2021 |
| EP | 1455278 | A1 | 9/2004 |
| EP | 3065347 | A1 | 9/2016 |

OTHER PUBLICATIONS

Office Action for DE Application No. 10 2022 202 455.9, 5 pages, Mar. 17, 2023.

* cited by examiner

DEVICE HAVING A COMMUNICATION APPARATUS FOR DATA TRANSFER VIA A DATA-TRANSFER BUS

CROSS-REFERENCE TO RELATED APPLICATIONS

This application is a U.S. National Stage Application of International Application No. PCT/EP2023/055991 filed Mar. 9, 2023, which designates the United States of America, and claims priority to DE Application No. 10 2022 202 455.9 filed Mar. 11, 2022, the contents of which are hereby incorporated by reference in their entirety.

TECHNICAL FIELD

The present disclosure relates to data transmission. Various embodiments of the teachings herein include systems and/or methods for data transmission via a data transmission bus.

BACKGROUND

An example communication apparatus for sending and/or receiving data (data transmission) via a data transmission bus has a device-side connection apparatus (for example plug connector) for connecting the device to the data transmission bus, wherein the device-side connection apparatus has electrical contacts that, in order to connect the device to the data transmission bus, are able to be connected in pairs to corresponding bus-side electrical contacts of a bus-side connection apparatus (for example mating plug connector) provided on the data transmission bus, wherein the electrical contacts comprise at least one data contact for transmitting a data signal, a first supply contact for transmitting a first supply potential (for example ground potential) and a second supply contact for transmitting a second supply potential (for example supply voltage) different from said first supply potential.

Such devices and data transmission systems formed thereby are known from the prior art in a wide variety of designs. One example is a data transmission system often used in vehicles, comprising what is known as a CAN ("Controller Area Network") bus (data transmission bus) to which one or more control devices and a multiplicity of further devices, for example each having at least one actuator and/or at least one sensor, are connected, wherein these devices are each equipped with a CAN transceiver including a CAN interface (communication apparatus) in order to send and/or receive data via the CAN bus. In such a data transmission system, each device connected to the data transmission bus requires a respective unique address (identifier), that is to say an address allocated only once in the data transmission system, in order to identify, by way of this address, the sending device (sender) when data are sent and/or the device (recipient) for which the data are intended with regard to the reception of data.

One possibility for such address allocation is to install devices each already having a suitably fixedly predefined address, or an address set prior to installation, in the data transmission system at the respectively intended locations (for example in a vehicle). A fixedly predefined address of a device may for example be predefined in this case to correspond (in a specific assignment) to a component identifier, which is usually defined for the device in any case for logistical reasons, such as for example "part number". However, this known procedure may be disadvantageous if multiple devices that are identical, for example a certain sensor model, are intended to be installed in one and the same data transmission system at multiple different locations. If these devices have an identical part number, the addresses of these devices cannot be predefined so as to correspond to the part number. If, on the other hand, the devices are provided with mutually different component identifiers in order to solve this problem, then this is unsatisfactory for logistical reasons.

In order to be able to install multiple specimens of a specific device (for example sensor model or actuator model) with identical part numbers at different positions, there may be on the device an additional contact to which the first supply potential or the second supply potential or even no potential is applied by way of the bus-side connection apparatus, depending on the specific installation position of the device, wherein each device then selects its address itself from three different predefined addresses by way of suitable device-side detection. At most three devices are able to be connected to the data transmission bus. In addition, correct assignment of the addresses may fail in this case if there is a cable break and/or a short circuit to one of the two supply potentials in the region of the coupling connection of one of the additional contacts.

U.S. Pat. No. 8,930,506 B2 discloses a system and method for the automatic allocation of addresses for devices connected to a data transmission bus. The devices each measure a parameter (for example a supply voltage) the value of which depends on the physical location of the device. The devices then communicate the measured parameters to a central controller at times that are computed by the devices in each case based on the respective measurement result. Finally, the central controller, based on the communicated parameters, allocates the addresses for the individual devices and communicates said addresses to the individual devices for storage there. This may create a need for a central controller to allocate the individual device addresses. Moreover, achieving said communication of the measured parameters along with the allocated addresses via the data transmission bus requires for example a certain amount of effort or number of adaptations to the communication apparatuses in the devices and the central controller, for which for example provision is not made in common data transmission standards.

SUMMARY

Teachings of the present disclosure set forth a novel way by way of which it is possible to ensure simple and reliable address allocation for multiple devices of the type mentioned at the outset connected to a data transmission bus. For example, some embodiments of the teachings herein include a device (1) having a communication apparatus (10) for sending and/or receiving data via a data transmission bus (2) and having a device-side connection apparatus (20) for connecting the device (1) to the data transmission bus (2), wherein the device-side connection apparatus (20) has electrical contacts (K1-K5) that, in order to connect the device (1) to the data transmission bus (2), are able to be connected in pairs to corresponding bus-side electrical contacts (K1'-K5') of a bus-side connection apparatus (20') provided on the data transmission bus (2), wherein the electrical contacts (K1-K5) comprise at least one data contact (K1, K2) for transmitting a data signal (CANL, CANH), a first supply contact (K3) for transmitting a first supply potential (GND) and a second supply contact (K4) for transmitting a second supply potential (VS) different from said first supply potential, characterized in that the electrical contacts (K1-K5) furthermore comprise an additional contact (K5), in that the device (1) has a voltmeter (30) that is designed to measure a potential (POT) present at the additional contact (K5, K5') with respect to the first supply potential (GND) and/or with respect to the second supply potential (VS), and in that the communication apparatus (10) is designed to assign an address to the device (1) for sending and/or receiving the data via the data transmission bus (2), said address being selected by the communication apparatus (10), from multiple different predefined addresses, on the basis of the potential (POT) measured at the additional contact (K5).

In some embodiments, the communication apparatus (10) is designed to select the address from at least four different predefined addresses.

In some embodiments, the communication apparatus (10) is designed to assess a case in which the measured potential (POT) corresponds to the first supply potential (GND) or the second supply potential (VS) as a fault.

In some embodiments, the communication apparatus (10) is designed to select the address to be assigned to the device (1) in accordance with an assignment table that defines mutually non-overlapping and mutually spaced-apart sub-ranges within the potential range between the first supply potential (GND) and the second supply potential (VS) and addresses respectively assigned to these sub-ranges.

In some embodiments, the device-side connection apparatus (20) has one or more electrical plug connectors that, in order to connect the device (1) to the data transmission bus (2), are able to be connected in pairs to corresponding bus-side electrical plug connectors of the bus-side connection apparatus (20').

In some embodiments, the device (1) furthermore has: a first resistor (R1), via which the additional contact (K5) is connected to the first supply contact (K3), and/or a second resistor (R2), via which the additional contact (K5) is connected to the second supply contact (K4).

As another example, some embodiments include a data transmission system, having a data transmission bus (2) having at least one data line (L1, L2) for transmitting a data signal (CANL, CANH), a first supply line (L3) for transmitting a first supply potential (GND) and a second supply line (L4) for transmitting a second supply potential (VS) different from said first supply potential, at least one device (1) as described herein, connected to the data transmission bus (2), for each device (1) connected to the data transmission bus (2), a respective bus-side connection apparatus (20'), provided on the data transmission bus (2), having bus-side electrical contacts (K1'-K5') that, in order to connect the respective device (1) to the data transmission bus (2), are connected in pairs to the corresponding electrical contacts (K1-K5) of the device-side connection apparatus (20) of the respective device (1) and comprise at least one bus-side data contact (K1', K2') for transmitting the data signal (CANL, CANH), a bus-side first supply contact (K3') for transmitting the first supply potential (GND), a bus-side second supply contact (K4') for transmitting the second supply potential (VS), and a bus-side additional contact (K5'), and furthermore having, for each of the at least one bus-side connection apparatus (20') provided on the data transmission bus (2): a third resistor (R3), via which the bus-side additional contact (K5') of the bus-side connection apparatus (20') in question is connected to the bus-side first supply contact (K3') of the bus-side connection apparatus (20') in question, and/or a fourth resistor (R4), via which the bus-side additional contact (K5') of the bus-side connection apparatus (20') in question is connected to the bus-side second supply contact (K4') of the bus-side connection apparatus (20') in question, wherein, in the case of multiple bus-side connection apparatuses (20') provided on the data transmission bus (2), the respective resistor arrangements, formed from a respective third resistor (R3) and/or a respective fourth resistor (R4), all differ from one another.

In some embodiments, the at least one bus-side connection apparatus (20') has in each case one or more bus-side electrical plug connectors that, in order to connect the respective device (1) to the data transmission bus (2), are able to be connected in pairs to corresponding electrical plug connectors of the device-side connection apparatus (20) of the respective device (1).

In some embodiments, the resistor arrangement, formed from the third resistor (R3) and/or the fourth resistor (R4), is formed at least partially, in particular completely, in the bus-side connection apparatus (20') in question.

In some embodiments, the data transmission system includes a control device (50*a*) connected to the data transmission bus (2*a*), said control device having a communication apparatus (60*a*) for sending and/or receiving data via the data transmission bus (2*a*), wherein the resistor arrangement, formed in each case from the third resistor (R3) and/or the fourth resistor (R4) for each bus-side connection apparatus (20') provided on the data transmission bus (2), is formed at least partially, in particular completely, in the control device (50*a*) and is connected to the bus-side connection apparatus (20') in question via an additional line (L5).

BRIEF DESCRIPTION OF THE DRAWINGS

The teachings herein are described in more detail below with the aid of exemplary embodiments with reference to the appended drawings, in which, in each case schematically.

DETAILED DESCRIPTION

Figure 1:
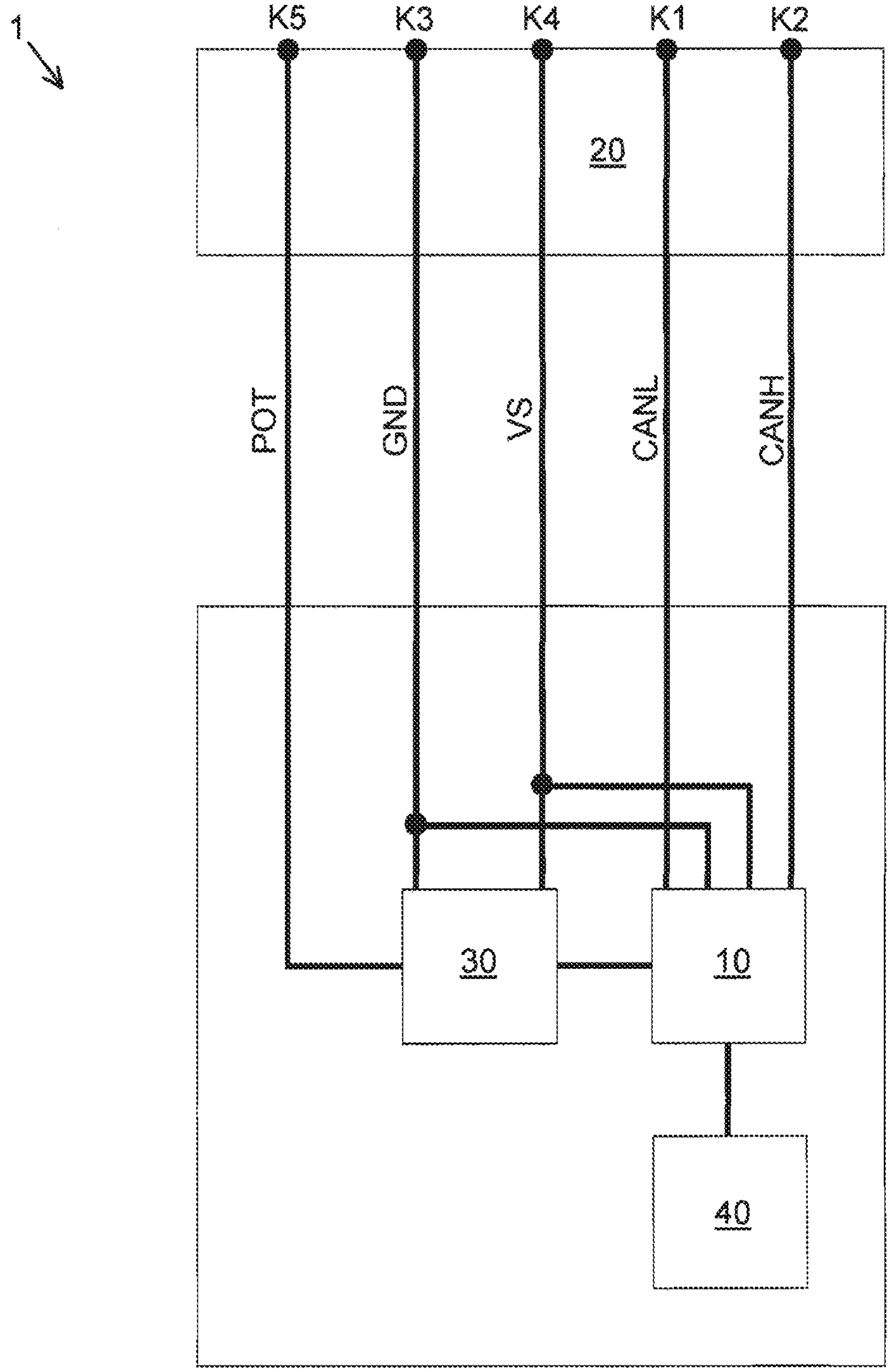
FIG. 1 shows an example device incorporating teachings of the present disclosure.

Some example embodiments of the teachings of the present disclosure include a device of the type mentioned at the outset, wherein the electrical contacts furthermore comprise an additional contact, that the device has a voltmeter that is designed to measure a potential present at the additional contact with respect to the first supply potential and/or with respect to the second supply potential, and that the communication apparatus is designed to assign an address to the device for sending and/or receiving the data via the data transmission bus, said address being selected by the communication apparatus, from multiple different predefined addresses, on the basis of the potential measured at the additional contact.

This makes it possible to achieve automatic allocation of the addresses of the individual devices (for example sensor apparatuses) on a data transmission bus (for example CAN bus), in particular including for multiple devices of identical design and for example having the same part number. In some embodiments, it is possible to use a larger number of devices, and no central instance is involved in allocating and assigning the individual device addresses. On the contrary, allocation and assignment are carried out autonomously by the individual devices. The devices are each able to determine their addresses themselves immediately after they are connected to the data transmission bus and use them in the normal way from the outset. In particular, there is no need for any special "start procedures" or preliminary adapted communications via the bus. The invention is therefore able to be used very universally.

In some embodiments, the data transmission bus is a CAN bus. However, it may also be used for any other data transmission system in which provision is made for addressable data transmission, that is to say with device addresses.

Depending on the accuracy of the device-side measurement of the potential present at the additional contact, this makes it possible to allocate a very large number of different addresses, and therefore a very large number of identical devices may be used in a data transmission system.

In some embodiments, the communication apparatus selects the address from at least four different predefined addresses. One example in this regard: Let us assume that five identical sensors are each intended to measure one or more measured values at five different positions in the exhaust system of a motor vehicle and communicate them to a central control device of the vehicle via a CAN bus. In this case, each sensor has to have its own CAN address, which is defined uniquely by its respective installation position. Each sensor is able to automatically and correctly set the CAN address required at the respective installation position by itself, according to its position. For this purpose, each sensor measures the potential at the additional contact and then selects its address from multiple different predefined addresses on the basis of the measured potential.

One simple way of providing the potential (hereinafter also referred to as "POT") at an additional contact of a device in a defined manner is to divide the supply voltage VS—GND (hereinafter also referred to as VBAT), which is provided in any case by the first supply potential (hereinafter also referred to as "GND") and the second supply potential (hereinafter also referred to as "VS"), by way of a voltage divider formed from two or more resistors, wherein at least one resistor of this voltage divider is arranged on the bus side.

With regard to the term "resistor" used here in connection with the formation of voltage dividers, it should be noted that this may, quite generally and in principle, also include direct electrical line connections with a resistance value that is negligibly low in practice (R=0Ω).

Each device may then for example measure the voltage between the additional contact and the first supply contact and thus determine the potential POT for example as a proportion of VBAT. In the above example of five devices, for example, provision may thus be made for five differently set potentials POT1 to POT5, as follows:

POT1=0% VBAT (corresponding to GND)
POT2=25% VBAT
POT3=50% VBAT
POT4=75% VBAT
POT5=100% VBAT (corresponding to VS)

Depending on the measured potential POT at the additional contact, each device may then, based on correspondingly stored voltage thresholds, select its respective address ADR (in the example: CAN-ID) from 5 different predefined addresses, ADR1 to ADR5, as follows:

POT=POT1: Select ADR=ADR1
POT=POT2: Select ADR=ADR2
POT=POT3: Select ADR=ADR3
POT=POT4: Select ADR=ADR4
POT=POT5: Select ADR=ADR5

In the above example, in which POT1 and POT5 each correspond to one of the two supply potentials GND, VS, this results in the disadvantage that, in the presence of a short circuit of an additional contact to one of the two supply potentials GND, VS, both correct address assignment and meaningful fault diagnosis may fail.

In some embodiments, the communication apparatus assesses a case in which the measured potential POT corresponds to the first supply potential GND or the second supply potential VS as a fault. In other words, in this embodiment, the values of the supply potentials GND, VS are not possible (permissible) values for the potential POT.

In one corresponding modification of the above example of five devices, for example, provision could be made for five differently set potentials POT1 to POT5, as follows:

POT1=50% VBAT
POT2=60% VBAT
POT3=70% VBAT
POT4=80% VBAT
POT5=90% VBAT

In some embodiments, the communication apparatus selects the address (ADR) to be assigned to the device in accordance with an assignment table that defines mutually non-overlapping and preferably mutually spaced-apart sub-ranges within the potential range between the first supply potential (GND) and the second supply potential (VS) and addresses respectively assigned to these sub-ranges. In this example, such mutually non-overlapping and mutually spaced-apart sub-ranges and the address assignment could for example be provided as follows:

48% VBAT<POT<52% VBAT: Select ADR=ADR1
58% VBAT<POT<62% VBAT: Select ADR=ADR2
68% VBAT<POT<72% VBAT: Select ADR=ADR3
78% VBAT<POT<82% VBAT: Select ADR=ADR4
88% VBAT<POT<92% VBAT: Select ADR=ADR5

If a device measures a potential POT that is not within one of the predefined sub-ranges (for example 55% VBAT in the above example), then this constitutes a fault and correct address allocation is then not possible.

In some embodiments, the communication assesses a case in which the measured potential (POT) is not within one of the predefined sub-ranges as a fault (and for example to send a fault message via the data transmission bus using a fault address fixedly predefined in the device).

In some embodiments, the way in which the potential POT is provided (for example the values of the resistors used to form said voltage dividers), in conjunction with the sub-ranges, is provided such that one, two or all three of the following faults are able to be recognized and distinguished from one another based on a (fault) potential POT that then arises in each case: Fault 1: Short circuit of the additional contact to GND; Fault 2: Additional contact open; Fault 3: Short circuit of the additional contact to VBAT.

As already mentioned further above, the potential POT at the additional contact of each device may be provided in each case by way of a voltage divider formed from resistors, wherein at least one resistor of the voltage divider has to be arranged on the bus side, that is to say outside the device. This is done in order here, for each device, to achieve in each case a voltage division the result of which (divided voltage or potential POT) depends on the position of the device, and a different address ADR is therefore able to be selected for each position.

In some embodiments, to connect the device to the data transmission bus, the device-side connection apparatus to be connected to a corresponding bus-side connection apparatus, said at least one resistor of the voltage divider in question may be formed in particular in the bus-side connection apparatus in question.

Accommodating the (at least one) resistor in the bus-side connection apparatus ends the need for any additional electrical line connection (for example additional cable or additional line in a data transmission bus line arrangement) connecting the resistor to the bus-side connection apparatus. It should not be ruled out that, in the case of a voltage divider, (at least) one bus-side resistor is arranged outside the bus-side connection apparatus in question (for example a plug connector of this connection apparatus) and connected to the bus-side connection apparatus in question (and the bus-side additional contact located there) via an additional line connection.

In some embodiments, the device-side connection apparatus has one or more electrical plug connectors (for example "plugs" or "sockets") that, in order to connect the device to the data transmission bus, are able to be connected in pairs to corresponding bus-side electrical (mating) plug connectors (for example "sockets" or "plugs") of the bus-side connection apparatus. In this case, said at least one bus-side resistor may thus be formed in particular in a plug connector (mating plug connector) of the bus-side connection apparatus in question in order there to connect the bus-side additional contact to the bus-side first supply contact or to the bus-side second supply contact.

Two resistors may also be formed in the bus-side connection apparatus in question or in a plug connector thereof, of which one resistor (hereinafter also referred to as "third resistor") connects the bus-side additional contact to the bus-side first supply contact and the other resistor (hereinafter also referred to as "fourth resistor") connects the bus-side additional contact to the bus-side second supply contact. The fact that at least one resistor of said voltage divider has to be arranged on the bus side, that is to say outside the device in question, in no way rules out at least one resistor of a resistor arrangement forming the voltage divider not also being arranged in the device, and in particular for example its device-side connection apparatus. In many cases, the latter even has special advantages, for instance with regard to the possibilities for and meaningfulness of a fault diagnosis.

In some embodiments, the device has a first resistor, via which the additional contact is connected to the first supply contact, and/or a second resistor, via which the additional contact is connected to the second supply contact. The first resistor and/or the second resistor of the device may be arranged in particular within the device-side connection apparatus.

In some embodiments, the object stated at the outset is achieved by a data transmission system having:

- a data transmission bus (for example CAN bus) having at least one data line for transmitting a data signal, a first supply line for transmitting a first supply potential and a second supply line for transmitting a second supply potential different from said first supply potential,
- at least one device of the kind described here, connected to the data transmission bus,
- for each device connected to the data transmission bus, a respective bus-side connection apparatus, provided on the data transmission bus, having bus-side electrical contacts that, in order to connect the respective device to the data transmission bus, are connected in pairs to the corresponding electrical contacts of the device-side connection apparatus of the respective device and comprise at least one bus-side data contact for transmitting the data signal, a bus-side first supply contact for transmitting the first supply potential, a bus-side second supply contact for transmitting the second supply potential, and a bus-side additional contact, wherein the data transmission system furthermore has, for each of the at least one bus-side connection apparatus provided on the data transmission bus:

- a resistor (hereinafter also referred to as "third resistor"), via which the bus-side additional contact of the bus-side connection apparatus in question is connected to the bus-side first supply contact of the bus-side connection apparatus in question, and/or
- a resistor (hereinafter also referred to as "fourth resistor"), via which the bus-side additional contact of the bus-side connection apparatus in question is connected to the bus-side second supply contact of the bus-side connection apparatus in question, wherein, in the case of multiple bus-side connection apparatuses provided on the data transmission bus, the respective resistor arrangements, formed from a respective third resistor and/or a respective fourth resistor, all differ from one another.

The embodiments and particular configurations described here for the devices may also be analogously provided individually or in any desired combination as embodiments or particular configurations of the data transmission systems incorporating teachings of the present disclosure, and vice versa.

In some embodiments, the at least one bus-side connection apparatus has in each case one or more bus-side electrical plug connectors that, in order to connect the respective device to the data transmission bus, are able to be connected in pairs to corresponding electrical plug connectors of the device-side connection apparatus of the respective device.

In some embodiments, the resistor arrangement, formed from the third resistor and/or the fourth resistor, to be formed at least partially, in particular completely, in the bus-side connection apparatus in question. The device-side and bus-side connection apparatuses may each have one or more electrical plug connectors that, in order to connect the device in question to the data transmission bus, are able to be connected in pairs to one another.

In some embodiments, the connection apparatuses provided on the device side and on the bus side for each device connected to the data transmission bus are each implemented by a single plug connector. In this case, these plug connectors each contain (at least) all of the electrical contacts required within the scope of the invention, that is to say the at least one data contact, the first supply contact, the second supply contact and the additional contact.

In some embodiments, the connection apparatuses to be connected to one other for each device are each implemented by multiple plug connectors or, as an alternative, by a plug connector and at least one other type of electrical connection apparatus. In particular, for example, for the connection between the first supply contacts (potential GND) and/or the connection between the second supply contacts (potential VS), it may be considered to implement these structurally separately from the other contact connections of the data transmission system.

By way of example, in particular in a vehicle, provision may for example be made in any case for an on-board power system for distributing a supply voltage (for example battery voltage), having lines for distributing a first supply potential and/or a second supply potential. In this respect, such an on-board power system may supply one or more devices used within the scope of the invention with the potential GND and/or potential VS, and thus constitute a functional component of the data transmission bus within the meaning of the disclosure. In addition, in the event that the potential GND is identical to a "ground potential" that is distributed in a vehicle in any case, for example via a (metal) chassis, it should not be ruled out that one or more of the devices are supplied with the potential GND by way of an electrical connection directly to an adjacent part of this chassis.

In some embodiments, the data transmission system has a control device connected to the data transmission bus, said control device having a communication apparatus for sending and/or receiving data via the data transmission bus, wherein the resistor arrangement, formed in each case from the third resistor and/or the fourth resistor for each bus-side connection apparatus provided on the data transmission bus, is formed at least partially, in particular completely, in the control device and is connected to the bus-side connection apparatus in question via an additional line.

In some embodiments, the devices described herein are part of a data transmission system in a vehicle. In vehicles, the devices provided may for example constitute or include sensors (for example for exhaust gas aftertreatment, battery monitoring, hydrogen measurement, etc.) and/or actuators (for example for actuating mechanically adjustable interior or exterior components, pumps such as for example coolant pumps, fans, etc.).

FIG. 1 shows an example device 1 having a communication apparatus 10 for sending and/or receiving data via a data transmission bus (not illustrated in FIG. 1) and having a device-side connection apparatus 20 for connecting the device 1 to the data transmission bus incorporating teachings of the present disclosure. In the example illustrated, the device 1 is a sensor apparatus implemented by way of a microcontroller and used in a vehicle, having a sensor 40 for measuring one or more specific measured values at a location in the vehicle (for example measurement of exhaust gas parameters in the exhaust system of a motor vehicle), wherein the communication apparatus 10 is designed as a CAN transceiver having a CAN interface in order to communicate the measured values, via the data transmission bus, which is designed in this case as a CAN bus, to other devices and/or a central control device, which is likewise connected to the data transmission bus, of the vehicle.

The CAN transceiver and its CAN interface may be implemented here with the aid of software and may be considered to be functional components of said microcontroller.

As a modification to the illustrated example, the communication apparatus 10 and accordingly the data transmission bus could however be provided in accordance with another data transmission standard or data transmission protocol.

The device-side connection apparatus 20, for example an electrical plug connector connected to an assembly containing the components 10 and 40 via an electrical line arrangement (for example connecting cable piece), as symbolized in FIG. 1, in the illustrated example, has electrical contacts K1-K5 that, in order to connect the device 1 to the data transmission bus, are able to be connected in pairs to corresponding bus-side electrical contacts (not illustrated in FIG. 1) of a bus-side connection apparatus (see for example 20' in FIG. 4) provided on the data transmission bus.

The device-side connection apparatus 20 (plug connector), which is symbolized only schematically in FIG. 1 as a single block, may generally, within the scope of the invention, be implemented by one or more electrical plug connectors and/or one or more other types of electrical connection apparatuses. All that is important is the ability to connect the electrical contacts K1-K5 in pairs to corresponding bus-side electrical contacts. The example involves the following contacts provided in accordance with the CAN standard:

K1: First data contact for transmitting a data signal CANL

K2: Second data contact for transmitting a data signal CANH

K3: First supply contact for transmitting a first supply potential GND

K4: Second supply contact for transmitting a second supply potential VS different from GND (and thus a supply voltage VBAT=VS—GND)

The connection apparatus 20 also has another contact:

K5: Additional contact for transmitting a potential POT

The device 1 furthermore has a voltmeter 30, which is preferably provided in structural combination with the components 10 and 40, for example on a common "device circuit carrier plate". At least when the device 10 is commissioned, the potential POT, present at the additional contact K5, with respect to the first supply potential GND is measured by way of the voltmeter 30.

The communication apparatus 10 is designed to assign an address to the device 1 for sending and/or receiving the data (data transmission), here in particular for sending the measured data obtained by way of the sensor 40, via the data transmission bus, said address being determined independently by the communication apparatus 10. This address is selected from multiple different predefined addresses on the basis of the potential POT measured at the additional contact K5. These predefined addresses are for this purpose stored in a memory apparatus of the communication apparatus 10, for instance in the form of a lookup table (assignment table). In some embodiments, the communication apparatus 10 is designed to select the address to be allocated for the device 1 from at least four different predefined addresses.

Figure 4:
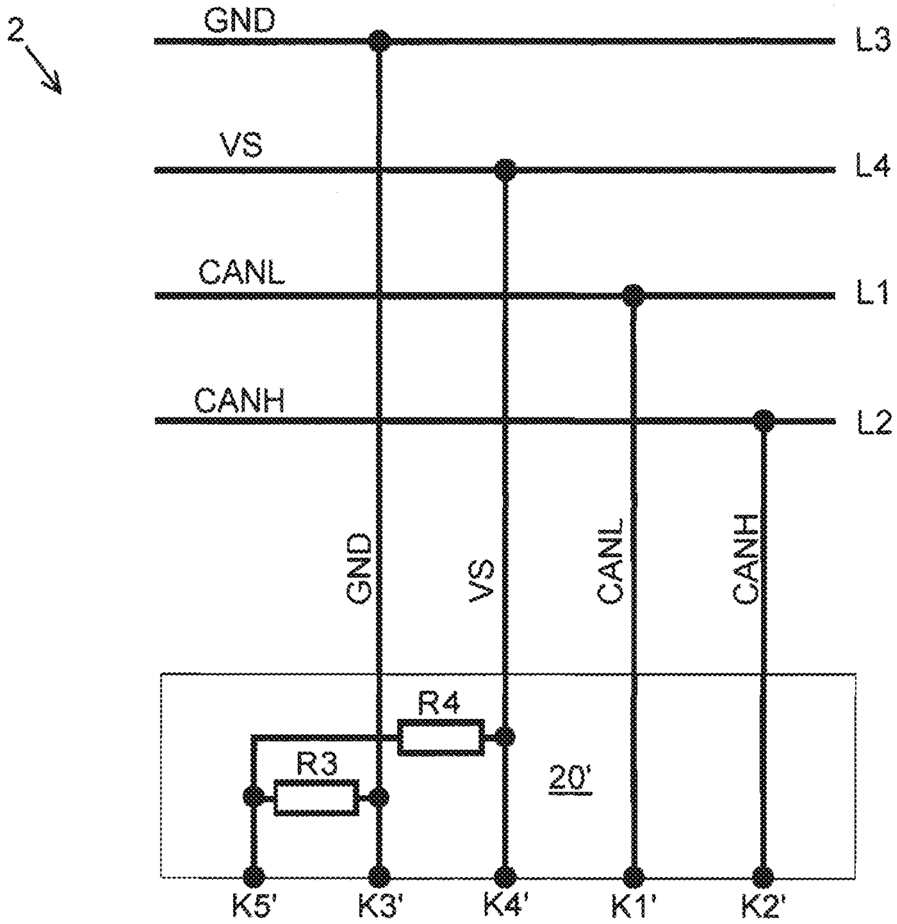
FIG. 4 shows an example data transmission bus including a bus-side connection apparatus for the connection of a device incorporating teachings of the present disclosure.

The operation of such address allocation in the device illustrated in FIG. 1 is explained by way of example for the case in which the device 1 is connected, together with further devices (not illustrated) of identical design, to a data transmission bus illustrated in FIG. 4.

FIG. 4 shows a data transmission bus 2 having a bus-side connection apparatus 20' for the connection of a device of the type described here.

It will be assumed below, by way of example, that the bus-side connection apparatus 20' illustrated in FIG. 4 is provided for the connection of the device 1 illustrated in FIG. 1. For the sake of simplifying the illustration, only a single connection apparatus 20' is shown in FIG. 4, that is to say the further bus-side connection apparatuses, which are present in practice, for connecting further devices to the data transmission bus 2 are not illustrated in FIG. 4.

In compatibility with the device 1 (here: CAN standard), the data transmission bus 2 has the following lines:

L1: Data line for transmitting the data signal CANL

L2: Data line for transmitting the data signal CANH

L3: First supply line for transmitting the first supply potential GND

L4: Second supply line for transmitting the second supply potential VS

The bus-side connection apparatus 20' has electrical contacts K1'-K4' that are electrically connected to these lines and an additional contact K5' that, when the two connection apparatuses 20, 20' are connected together, are connected in pairs to the corresponding electrical contacts K1-K4 and K5 of the device-side connection apparatus 20 (K1' to K1, K2' to K2, etc.).

In order here to provide a potential POT that is predetermined for the device 1 or for the illustrated position on the data transmission bus 2 at the additional contact K5 in a defined manner, the supply voltage provided by the two supply potentials GND and VS (VBAT=VS—GND) is divided by way of a voltage divider that is formed from two resistors R3, R4 in the described example.

In the example of FIG. 4, both resistors R3, R4, as illustrated, are accommodated in the bus-side connection apparatus 20', wherein the resistor R3 is arranged between the additional contact K5' and the first supply contact K3' and the resistor R4 is arranged between the additional contact K5' and the second supply contact K4'.

The potential POT present at the additional contact K5', and thus also K5, is thus POT=(R3/(R3+R4))×VBAT, and may therefore be predefined as desired within the interval [GND, VS] through an appropriate selection of the resistance values of R3 and R4.

The further bus-side connection apparatuses, not illustrated in FIG. 4, for connecting further devices to the data transmission bus 2 may each be designed for example in exactly the same way as the illustrated connection apparatus 20', but wherein the respective resistance arrangements (voltage dividers) formed from a respective third resistor (R3) and/or a respective fourth resistor (R4) all differ from one another, such that the respective predefined potentials (POT) therefore also all differ from one another.

As already explained further above for the device 1, all of the other devices (not illustrated) connected to the data transmission bus 2 may then also each independently assign their address required to send and/or receive data based on the result of a measurement of the respective potential POT.

A termination, which is required in many application cases, at the branch ends of the data transmission bus in question, for example a 120-ohm termination of the lines for CANL and CANH at the start (for example formed by a control device) and at the end of the CAN branch, may be provided in particular for example in the bus-side connection apparatuses in question (for example plug connectors) for the two devices in question. In some embodiments, all of the devices may be equipped with suitable terminations that are however able to be activated or deactivated individually on the individual devices by way of a respective switch apparatus.

In the following description of further exemplary embodiments, the same reference numerals are used for functionally identical components, each supplemented by a lower-case letter to distinguish the embodiment. Essentially only the differences from the embodiments already described will be discussed, and in other regards reference is explicitly made to the description of preceding exemplary embodiments.

Figure 2:
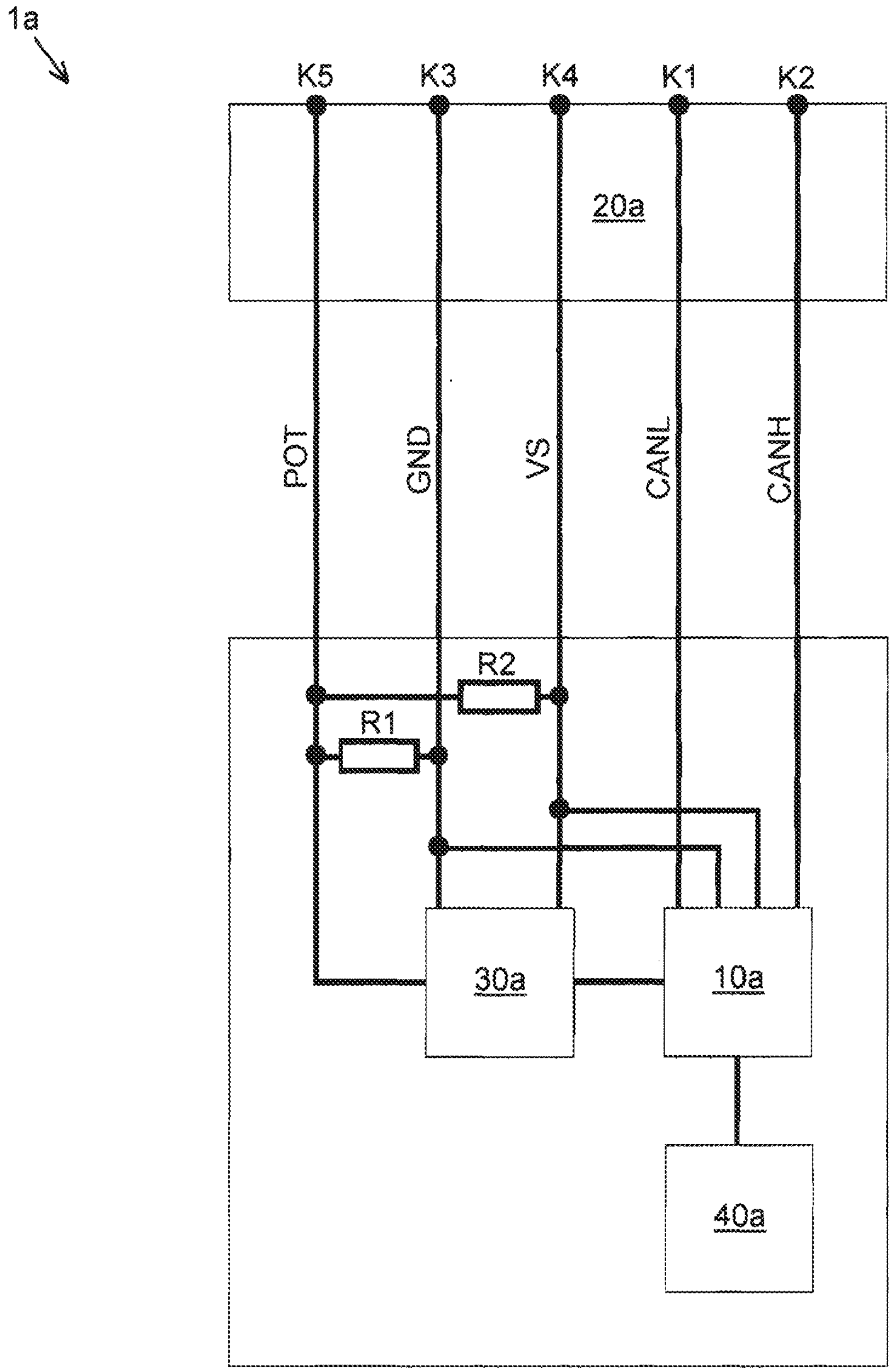
FIG. 2 shows an example device incorporating teachings of the present disclosure.

FIG. 2 shows a device 1*a* having a communication apparatus 10*a* for sending and/or receiving data via a data transmission bus (not illustrated in FIG. 2) and having a device-side connection apparatus 20*a* for connecting the device 1*a* to the data transmission bus. One special feature of the device 1*a* compared to the device 1 already described (FIG. 1) is that the device 1*a* furthermore has a resistor R1, via which the additional contact K5 is connected to the first supply contact K3, and a resistor R2, via which the additional contact K5 is connected to the second supply contact K4.

In the example of FIG. 2, both resistors R1, R2 are structurally combined with the components 10*a*, 30*a*, 40*a*, as symbolized in FIG. 2, for example accommodated on a circuit carrier plate provided for these components. The operation of the automatic address allocation in the device 1*a* illustrated in FIG. 2 is explained again by way of example for the case in which the device 1*a* is connected, together with further devices (not illustrated) of identical design, to the data transmission bus 2 illustrated in FIG. 4.

In this case too, the potential POT predetermined for the device 1*a* or for its position on the data transmission bus 2 at the additional contact K5 is provided by dividing the supply voltage (VBAT=VS—GND) by way of a voltage divider, which in this case however is formed from the total of four resistors R1, R2, R3, R4.

The potential POT present at the additional contact K5 here is:

$$POT=(R1\times R3/(R1+R3))/((R1\times R3/(R1+R3))+(R2\times R4/(R2+R4)))\times VBAT$$

In clearer terms, the potential POT may be understood here for example to mean that any arbitrarily predefinable "base potential" having the value (R1/(R1+R2))×VBAT within the interval [GND, VS] is predefined by the voltage divider R1, R2 on the device side, but this is then "shifted" due to the parallel connection of the bus-side voltage divider R3, R4 (and thus different for each of the individual devices).

In some embodiments, a "base potential" is provided through an appropriate selection of the resistance values of R1 and R2, and is in a "middle range" of the interval [GND, VS], and is for example at least 5% VBAT, in particular at least 10% VBAT and for example at most 95% VBAT, in particular at most 90% VBAT. In this case, the "shifted base potential" (potential at the additional contact K5), shifted by the effect of the parallel-connected bus-side voltage divider R3, R4, may be predefined as desired within the interval [GND, VS] through an appropriate selection of the resistance values of R3 and R4.

One example in this regard: Selecting resistance values R1=1 kΩ and R2=3 kΩ results in a "base potential" (identical for all devices) of 25% VBAT. If the resulting potential POT for a specific device or its position should be 35% VBAT, for example, then this may be achieved for example by selecting resistance values R3=12 kΩ and R4=4 kΩ. If the resulting potential POT for another device should be 40% VBAT, for example, then this may be achieved for example with R3=1 kΩ and R4=1 kΩ.

As a modification to the above-described example of the use of two bus-side resistors (R3, R4), the base potential may also be shifted as desired by way of just one of the two illustrated resistors (R3, R4). If the base potential (for example 25% VBAT) should be shifted to a lower value (for example 20% VBAT), then an appropriately dimensioned resistor R3 is sufficient for this, and if the base potential should be shifted to a higher value (for example 30% VBAT), then an appropriately dimensioned resistor R4 is sufficient for this.

Finally, it should be noted in this context that, for the special case in which the potential POT should be exactly equal to the base potential for a specific device (or its position), there are two possibilities: One possibility is to select the values of the bus-side resistors R3, R4 such that their ratio to one another corresponds to the ratio of the values of the device-side resistors R1, R2. Another possibility is not to provide any bus-side resistors R3, R4 for this device (such that the potential POT results solely from the voltage division at the resistor arrangement R1, R2).

One example in this regard: On the device side, for example on the circuit carriers of the respective devices (for example "sensor board"), there is formed for example a voltage divider (consisting of resistors R1, R2) for providing a base potential in a medium potential range, for example 25% VBAT. For any shift of this base potential within the interval [GND, VS], a single further resistor in each bus-side connection apparatus (on-board power system plug) is sufficient, for example:

Device position 1: Additional contact K5' electrically conductive (R3=0Ω) to GND

POT=0% VBAT=GND

Device position 2: Additional contact K5' open

POT=25% VBAT

Device position 3: Additional contact via R4 high-resistance at VBAT

POT=50% VBAT

Device position 4: Additional contact K5' via R4 low-resistance at VBAT

POT=75% VBAT

Device position 5: Additional contact K5' electrically conductive (R4=0Ω) to VBAT

POT=100% VBAT=VS

Also one example modified with regard to the individual values of the potential POT in this regard:

Device position 1: Additional contact via R4 high-resistance at VBAT,

POT=50% VBAT

Device position 2: Additional contact K5' via R4 medium-resistance at VBAT

POT=60% VBAT

Device position 3: Additional contact K5' via R4 medium-low-resistance at VBAT

POT=70% VBAT

Device position 4: Additional contact K5' via R4 low-resistance at VBAT

POT=80% VBAT

Device position 5: Additional contact K5' via R4 very low-resistance at VBAT

POT=90% VBAT

In both of the above examples, said resistors R3 or R4 may each be arranged in the bus-side connection apparatus in question or for example be arranged in a control device and connected to the device in question or the device-side connection apparatus in question via an additional line (for example cable).

In the above second example, the following faults are able to be recognized easily:

- Fault 1: Additional contact short circuit to GND, recognizable by POT=0% VBAT.
- Fault 2: Additional contact open, recognizable by POT=25% VBAT.
- Fault 3: Additional contact short circuit to VBAT, recognizable by POT=100% VBAT.

In the event that a device recognizes such a fault (impermissible value of POT), provision may be made for example for the device to register with a different, "fault" address that is not used for normal data transmission and to send corresponding fault information (for example fault code), wherein this fault information specifies the fault in more detail (for example through the measured value of POT). By way of example, another device connected to the data transmission bus (for example a diagnostics or control device) may thus record the fault immediately.

Figure 3:
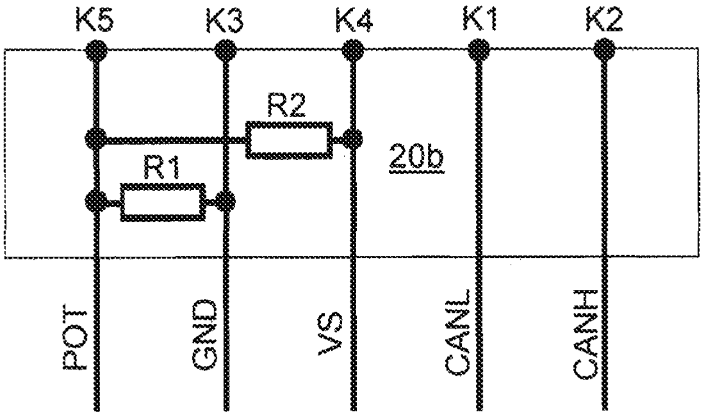
FIG. 3 shows a connection apparatus of an example device incorporating teachings of the present disclosure.

FIG. 3 illustrates a modification of the device 1*a* of FIG. 2, wherein, in FIG. 3, only the device-side connection apparatus 20*b* for connecting the device to the data transmission bus is illustrated for the sake of simplifying the illustration. The modification, compared to the device 1*a* (FIG. 2) already described, is that the resistors R1 and R2 that form the device-side voltage divider are arranged in the region of the device-side connection apparatus 20*b*, that is to say for example in an electrical plug connector.

Figure 5:
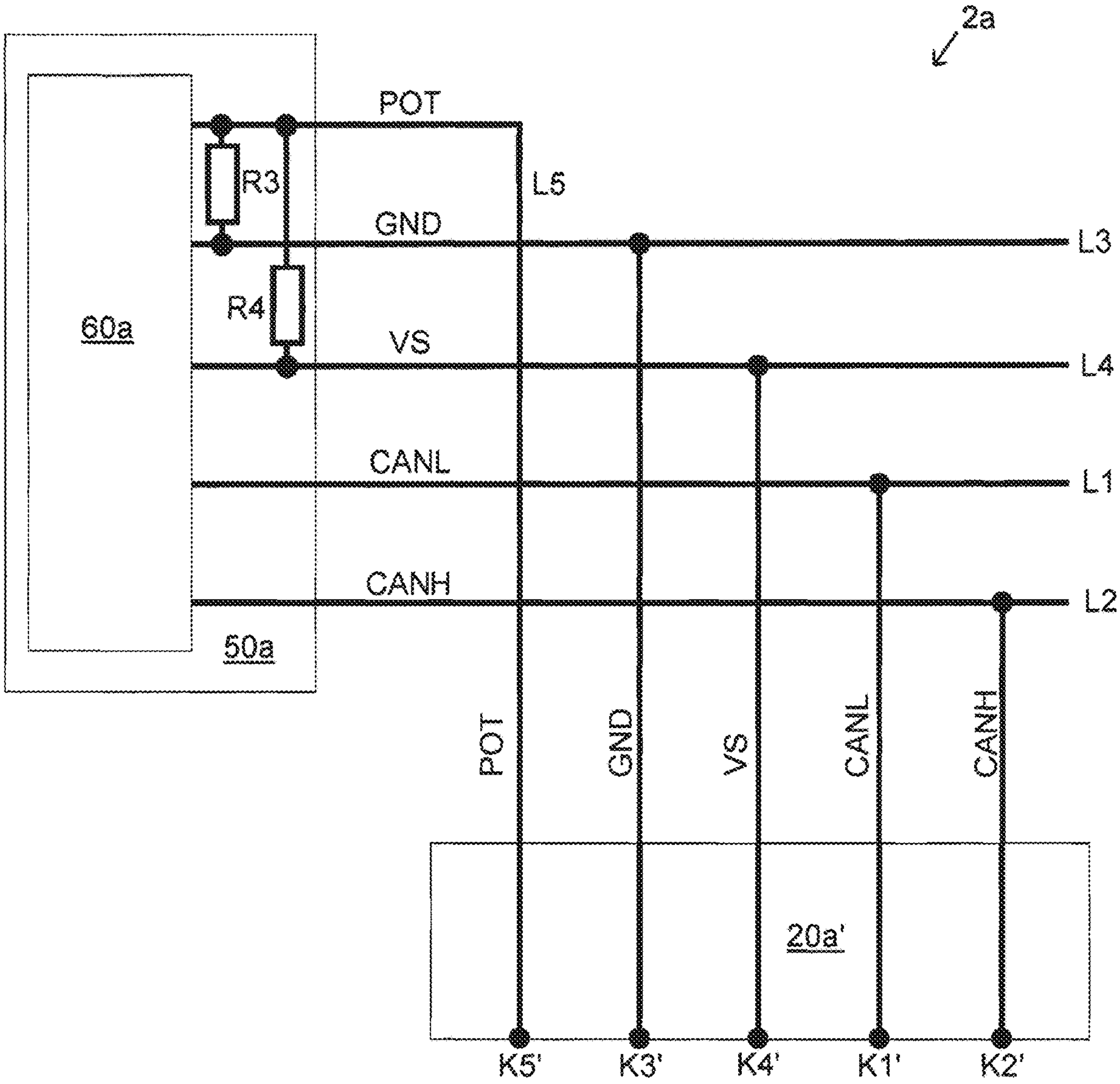
FIG. 5 shows an example data transmission bus including a bus-side connection apparatus for the connection of a device incorporating teachings of the present disclosure.

FIG. 5 shows a data transmission bus 2*a* having a bus-side connection apparatus 20*a*' for the connection of a device of the type described here, for example the device 1 illustrated in FIG. 1. In compatibility with the device 1 (here: CAN standard), the data transmission bus 2*a* again has the lines L1-L4, already described further above with reference to FIG. 4, for transmitting the signals CANL, CANH and potentials GND, VS, and the bus-side connection apparatus 20*a*' has the electrical contacts K1'-K4', electrically connected to these lines L1-L4, and the additional contact K5' for providing the potential POT for a device (not illustrated in the figure) connected to the connection apparatus 20*a*'.

FIG. 5 also shows a control device 50*a* having a communication apparatus 60*a*, which control device is likewise connected to the data transmission bus 2*a*, as illustrated, and for example constitutes a central control device in a vehicle and, in this context, carries out control tasks in the vehicle, for example by activating actuator apparatuses connected to the bus 2*a* and/or by querying measured values from sensor apparatuses connected to the bus 2*a*.

In contrast to the example described with reference to FIG. 4, the resistors R3, R4, forming a bus-side voltage divider, are not accommodated in the bus-side connection apparatus 20*a*', but rather (in this example both), as illustrated, in the control device 50*a*, wherein the resistor R3 is arranged between an additional line L5 and the first supply line L3 and the resistor R4 is arranged between the additional line L5 and the second supply line L4, and wherein the additional line L5 runs along the other bus lines L1-L4 (parallel thereto) as far as the location of the connection apparatus 20*a*' and, from there, on into the connection apparatus 20*a*', and is electrically connected there to the additional contact K5'.

For the sake of simplifying the illustration, FIG. 5 does not illustrate an optionally provided connection apparatus of the device 50*a* having the corresponding electrical contacts for connection to the lines of the bus 2*a* (in this case, the resistors R3, R4 may also each be arranged between the corresponding respective contacts of such a connection apparatus). For the sake of simplifying the illustration, FIG. 5 also additionally omits the further bus-side connection apparatuses, which are present in practice, for connecting further devices to the data transmission bus 2*a*. In this context, it should be noted that, for such further bus-side connection apparatuses as well, resistors R3, R4 forming a respective bus-side voltage divider may likewise be accommodated in the control device 50*a* and may be connected, by a respective further electrical connection such an additional line (for example running parallel to the other bus lines), to the further bus-side connection apparatus in question and the additional contact provided therein.

A plurality of devices of the type described here, such as for example a plurality of devices according to one of the exemplary embodiments of FIGS. 1, 2 and 3, together with an associated data transmission bus to which these devices (and optionally, independently thereof, also at least one additional device, such as in particular a control device, having for example a fixedly predefined device address) are connected, forms a data transmission system in which the devices are able to assign themselves an address for communication via the data transmission bus.

One example use of the teachings herein is in a vehicle or other machine having an internal combustion engine, wherein an exhaust gas aftertreatment system having multiple different catalytic converters is installed and the need arises to measure measured variables such as for example NOx content and/or lambda at up to five consecutive locations in the exhaust gas path and to communicate them to a control device. The devices, which are designed as sensor apparatuses in this case, may be required for example at the following locations: (1) location at the start of the exhaust gas path (raw emission), (2) location downstream of the pre-catalytic converter, (3) location downstream of the storage catalytic converter, (4) location downstream of the first SCR catalytic converter, (5) location downstream of the second SCR/barrier catalytic converter. The systems and/or methods may, at such different locations in the exhaust gas path, use sensor apparatuses of completely identical design (accordingly with for example identical part numbers).

Since in practice cables could break, resistors could be damaged, etc., a controller (for example the abovementioned control device) may check the plausibility of the automatically allocated addresses of the individual devices. Where the individual devices are sensor apparatuses, such a plausibility check may be carried out for example on the basis of the measured values delivered by the sensors in question. If multiple devices are for example sensor apparatuses of identical design but arranged at different locations in a vehicle (for example different locations along an exhaust gas path), a plausibility check may be carried out for example based on a temperature respectively measured by the devices (where for example different temperatures may be expected at the different locations). Provision may also be made for example in a controller for a model (taking into consideration physical variables such as temperature, heating power, etc.) for predicting such measured values, wherein a plausibility check may then also be carried out on the basis of a comparison between measured values and modeled values.

Figure 6:
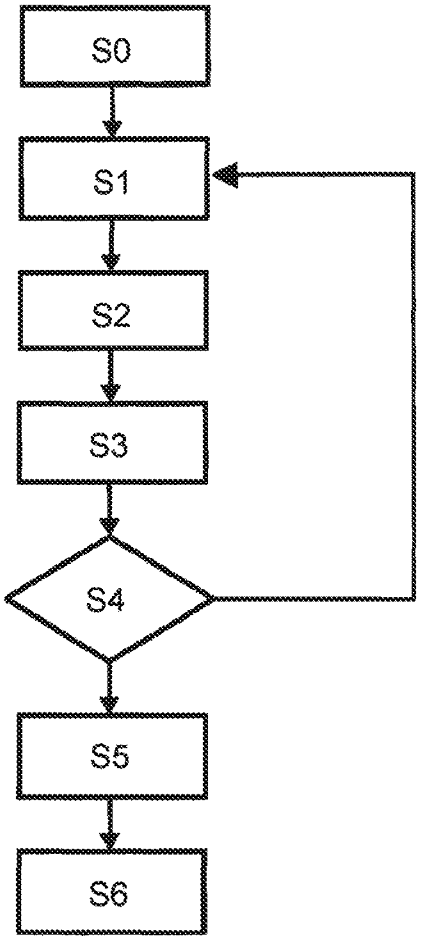
FIG. 6 shows a flowchart of an example method for automatically allocating an address following connection of a device to a data transmission bus incorporating teachings of the present disclosure.

FIG. 6 shows, by way of example, a possible sequence of a method for automatic allocation of an address in a device of the type described here, which is operated by control software running in the device. The method begins with a step S0 with the connection of a device in question to a data transmission bus and the device being supplied with the supply potentials GND, VS, and thus a supply voltage VBAT (=VS−GND).

In a step S1, the device is initialized and the control software is booted. In a step S2, the potential POT is measured at the additional contact of the device-side connection apparatus, implemented for example as a voltage measurement with respect to the first supply potential GND. In a step S3, in this example, the ratio between the potential difference POT—GND (result of voltage measurement in step S2), on the one hand, and the supply voltage VBAT (=VS−GND), on the other hand, is determined:

$$\text{ratio} = (POT - GND)/(VS - GND)$$

In a step S4, it is checked whether the value of "ratio" falls within a range permissible therefor. If this is the case, the processing proceeds to a step S5, in which the correct address ADR for the device is assigned on the basis of this value, and then to a step S6, in which a data transmission mode of the device is started using the previously set device address ADR.

However, if the value of "ratio" does not fall within a range permissible therefor, then the processing returns to step S1.

Figure 7:
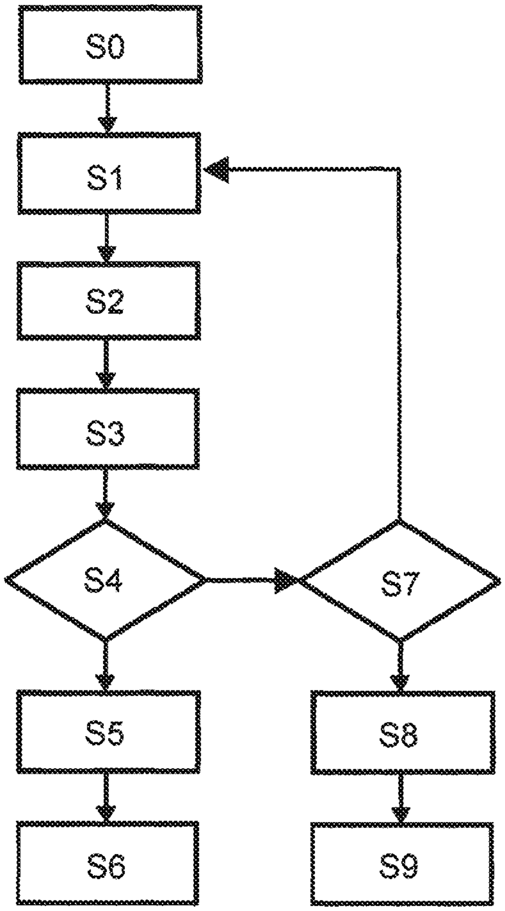
FIG. 7 shows a flowchart of an example method for automatically allocating the address incorporating teachings of the present disclosure.

FIG. 7 shows one example of an address allocation method that has been modified compared to the example of FIG. 6. Steps S0 to S6 correspond here to steps S0 to S6 already described with reference to FIG. 6. However, in contrast thereto, in the event that the value of "ratio" checked in step S4 does not fall within a range permissible therefor, provision is made, based on the result of a check in a step S7, for the processing to proceed back to step S1 only up to a predetermined number of times (for example in the range between 1 and 10) when step S7 is reached, but otherwise (that is to say if step S7 has been reached again after this number of times), the processing proceeds to a step S8.

In step S8, a predetermined "fault" address is assigned for the device and then, in a step S9, a predetermined "fault" message is sent using the previously set fault address. In one embodiment, the fault message contains information about at least one detail about the fault in question, such as in particular for example one or more values of the ratio as determined by the device.

By virtue of receiving and evaluating the fault message by way of another device connected to the data transmission bus, be this for example a device connected specifically for fault diagnosis or for example a control device of the type described further above, the occurrence of the fault is able to be recognized immediately after the device in question is connected.

The teachings herein and the described exemplary embodiments make it possible to implement data transmission systems with autonomous address allocation on the device side. Such systems and the data transmission bus used therein, for example CAN bus, are advantageously able to be used in vehicles or other technical apparatuses such as machines.

In summary, the teachings herein propose a device (1) having a communication apparatus (10) and having a connection apparatus (20) for connecting the device (1) to a data transmission bus (2), wherein the connection apparatus (20) has electrical contacts (K1-K5) that, in order to connect the device (1) to the bus (2), are able to be connected in pairs to corresponding bus-side electrical contacts (K1'-K5') of a bus-side connection apparatus (20') provided on the bus (2), and wherein the electrical contacts (K1-K5) comprise at least one data contact (K1, K2) for transmitting a data signal (CANL, CANH), a first supply contact (K3) for transmitting a first supply potential (GND) and a second supply contact (K4) for transmitting a second supply potential (VS) different from said first supply potential. In order to enable simple and reliable address allocation for multiple devices (1) connected to the data transmission bus (2), the electrical contacts (K1-K5) furthermore comprise an additional contact (K5), for the device (1) has a voltmeter (30) to measure a potential (POT) present at the additional contact (K5, K5'), and the communication apparatus (10) to assign an address to the device (1), said address (10) selected from multiple different predefined addresses on the basis of the potential (POT) measured at the additional contact (K5).

What is claimed is:

1. A device comprising:

a communication apparatus for sending and/or receiving data via a data transmission bus;

a device-side connection apparatus to connect the device to the data transmission bus;

wherein the device-side connection apparatus includes electrical contacts configured to be connected in pairs to corresponding bus-side electrical contacts of a bus-side connection apparatus on the data transmission bus;

wherein the electrical contacts comprise a data contact to transmit a data signal, a first supply contact to transmit a first supply potential, a second supply contact to transmit a second supply potential different from said first supply potential, and a third contact; and a voltmeter to measure a potential present at the third contact with respect to the first supply potential and/or the second supply potential;

wherein the communication apparatus assigns an address to the device for sending and/or receiving the data via the data transmission bus, said address selected from multiple different predefined addresses on the basis of the potential measured at the third contact.

2. The device as claimed in claim 1, wherein the communication apparatus selects the address from at least four different predefined addresses.

3. The device as claimed in claim 1, wherein the communication apparatus identifies a fault if the measured potential corresponds to the first supply potential or the second supply potential as a fault.

4. The device as claimed in claim 1, wherein the communication apparatus selects the address using an assignment table defining mutually non-overlapping sub-ranges within the potential range between the first supply potential and the second supply potential and addresses respectively assigned to these sub-ranges.

5. The device as claimed in claim 1, wherein the device-side connection apparatus includes an electrical plug connector configured to be connected in pairs to corresponding bus-side electrical plug connectors of the bus-side connection apparatus.

6. The device as claimed in claim 1, further comprising:

a first resistor via which the third contact is connected to the first supply contact; and/or a second resistor via which the third contact is connected to the second supply contact.

7. A data transmission system comprising:

a data transmission bus with at least one data line for transmitting a data signal, a first supply line for transmitting a first supply potential, and a second supply line for transmitting a second supply potential different from said first supply potential;

a device connected to the data transmission bus, the device comprising: a communication apparatus for sending and/or receiving data via the data transmission bus, and a device-side connection apparatus to connect the device to the data transmission bus;

wherein the device-side connection apparatus includes electrical contacts configured to be connected in pairs to corresponding bus-side electrical contacts of a bus-side connection apparatus on the data transmission bus;

wherein the electrical contacts comprise a data contact to transmit a data signal, a first supply contact to transmit a first supply potential, a second supply contact to transmit a second supply potential different from said first supply potential, and a third contact;

wherein the device further includes a voltmeter to measure a potential present at the third contact with respect to the first supply potential and/or the second supply potential;

wherein the communication apparatus assigns an address to the device for sending and/or receiving the data via the data transmission bus, said address selected from multiple different predefined addresses on the basis of the potential measured at the third contact;

a respective bus-side connection apparatus on the data transmission bus, having bus-side electrical contacts that are connected in pairs to the corresponding electrical contacts of the device-side connection apparatus of the respective device and comprise at least one bus-side data contact for transmitting the data signal, a bus-side first supply contact for transmitting the first supply potential, a bus-side second supply contact for transmitting the second supply potential, and a bus-side additional contact; and for each of the at least one bus-side connection apparatus on the data transmission bus: a third resistor, via which the bus-side additional contact of the bus-side connection apparatus in question is connected to the bus-side first supply contact of the bus-side connection apparatus in question, and/or a fourth resistor via which the bus-side additional contact of the bus-side connection apparatus in question is connected to the bus-side second supply contact of the bus-side connection apparatus in question;

wherein, in the case of multiple bus-side connection apparatuses provided on the data transmission bus, the respective resistor arrangements, formed from a respective third resistor and/or a respective fourth resistor, all differ from one another.

8. The data transmission system as claimed in claim 7, wherein the bus-side connection apparatus has one or more bus-side electrical plug connectors to connect the respective device to the data transmission bus, configured to be connected in pairs to corresponding electrical plug connectors of the device-side connection apparatus of the respective device.

9. The data transmission system as claimed in claim 7, wherein the resistor arrangement formed from the third resistor and/or the fourth resistor is formed at least partially in the bus-side connection apparatus in question.

10. The data transmission system as claimed in claim 7, furthermore comprising:

a control device connected to the data transmission bus, the control device having a communication apparatus to send and/or receive data via the data transmission bus;

wherein the resistor arrangement formed from the third resistor and/or the fourth resistor for each bus-side connection apparatus provided on the data transmission bus, is formed at least partially in the control device and is connected to the bus-side connection apparatus in question via an additional line.

* * * * *